US009026822B2

(12) United States Patent
Miwa et al.

(10) Patent No.: US 9,026,822 B2
(45) Date of Patent: May 5, 2015

(54) DYNAMICALLY ADJUSTING OPERATING FREQUENCY OF A ARITHEMETIC PROCESSING DEVICE FOR PREDETERMINED APPLICATIONS BASED ON POWER CONSUMPTION OF THE MEMORY IN REAL TIME

(75) Inventors: Masahiro Miwa, Kawasaki (JP); Akira Naruse, Machida (JP)

(73) Assignee: Fujitsu Limited, Kawasaki (JP)

( * ) Notice: Subject to any disclaimer, the term of this patent is extended or adjusted under 35 U.S.C. 154(b) by 212 days.

(21) Appl. No.: 13/471,534

(22) Filed: May 15, 2012

(65) Prior Publication Data
US 2013/0024707 A1    Jan. 24, 2013

(30) Foreign Application Priority Data

Jul. 19, 2011    (JP) .................................. 2011-158478

(51) Int. Cl.
*G06F 1/00* (2006.01)
*G06F 1/32* (2006.01)

(52) U.S. Cl.
CPC ............ *G06F 1/3225* (2013.01); *G06F 1/3296* (2013.01)
USPC .......................................... 713/322; 713/320

(58) Field of Classification Search
USPC .......................... 713/322, 340, 323, 324, 300
See application file for complete search history.

(56) References Cited

U.S. PATENT DOCUMENTS 5,073,874 A * 12/1991 Yamada et al. ............... 365/226
5,703,486 A * 12/1997 Arai et al. ..................... 324/427
5,826,092 A * 10/1998 Flannery ....................... 713/324
6,081,901 A *  6/2000 Dewa et al. ................... 713/300
6,230,279 B1 *  5/2001 Dewa et al. ................... 713/324
6,298,448 B1 * 10/2001 Shaffer et al. ................. 713/322
6,378,081 B1 *  4/2002 Hammond .................... 713/501
6,820,209 B1 * 11/2004 Culbert et al. ................ 713/501
6,920,528 B1 *  7/2005 Chan ............................. 711/115
7,111,109 B2 *  9/2006 Tsunemiya et al. .......... 711/103
7,146,513 B2 * 12/2006 Misaka et al. ................ 713/320
7,219,245 B1    5/2007 Raghuvanshi
7,240,239 B2 *  7/2007 Suzaki ........................... 714/15
7,610,497 B2 * 10/2009 Lin et al. ....................... 713/320

(Continued)

FOREIGN PATENT DOCUMENTS

JP         4-239305 A    8/1992
JP     2003-256495 A    9/2003

(Continued)

OTHER PUBLICATIONS

Ian Harrires, "Memory", p. 1, Pub. Date: Nov. 4, 2004.*

(Continued)

*Primary Examiner* — Thomas Lee
*Assistant Examiner* — Santosh R Poudel
(74) *Attorney, Agent, or Firm* — Fijitsu Patent Center (57) ABSTRACT

An information processing apparatus 1 includes a memory 13 that stores information used for arithmetic processing. The information processing apparatus 1 includes a CPU 11 that operates arithmetic processing by using the information stored in the memory 13. The information processing apparatus 1 includes a measuring unit 15 that measures power consumption of the memory 13. The information processing apparatus 1 includes a CPU frequency controlling unit setting unit 31 that sets an operating frequency of the CPU 11 according to the power consumption measured by the measuring unit 15.

7 Claims, 7 Drawing Sheets

(56) References Cited

U.S. PATENT DOCUMENTS

| | | | |
|---|---|---|---|
| 7,739,532 B2 * | 6/2010 | Grobman | 713/322 |
| RE42,213 E * | 3/2011 | Dwarkadas et al. | 711/128 |
| 7,930,469 B2 * | 4/2011 | Brittain et al. | 711/105 |
| 8,219,993 B2 * | 7/2012 | Johnson et al. | 718/102 |
| 8,302,098 B2 * | 10/2012 | Johnson et al. | 718/102 |
| 8,869,152 B1 * | 10/2014 | Abrishami et al. | 718/102 |
| 2002/0042889 A1 * | 4/2002 | Takahashi et al. | 713/320 |
| 2002/0093478 A1 * | 7/2002 | Yeh | 345/98 |
| 2003/0002354 A1 * | 1/2003 | Schroegmeier et al. | 365/189.11 |
| 2003/0005214 A1 * | 1/2003 | Chan | 711/104 |
| 2004/0158878 A1 * | 8/2004 | Ratnakar et al. | 725/150 |
| 2006/0168571 A1 * | 7/2006 | Ghiasi et al. | 717/127 |
| 2006/0230295 A1 * | 10/2006 | Schumacher et al. | 713/300 |
| 2006/0253715 A1 * | 11/2006 | Ghiasi et al. | 713/300 |
| 2006/0259801 A1 * | 11/2006 | Chu et al. | 713/300 |
| 2006/0288243 A1 * | 12/2006 | Kim | 713/300 |
| 2007/0139014 A1 | 6/2007 | Girson et al. | |
| 2007/0198778 A1 * | 8/2007 | Chaudhry et al. | 711/122 |
| 2008/0034236 A1 * | 2/2008 | Takayama et al. | 713/322 |
| 2008/0071939 A1 * | 3/2008 | Tanaka et al. | 710/18 |
| 2008/0133829 A1 * | 6/2008 | Tsuji | 711/112 |
| 2008/0162970 A1 * | 7/2008 | Yamaji | 713/323 |
| 2009/0153572 A1 * | 6/2009 | Nam | 345/520 |
| 2009/0190427 A1 * | 7/2009 | Brittain et al. | 365/212 |
| 2009/0271649 A1 * | 10/2009 | Loffink et al. | 713/340 |
| 2010/0057983 A1 * | 3/2010 | Borras et al. | 711/105 |
| 2011/0022876 A1 * | 1/2011 | Sasaki | 713/501 |

FOREIGN PATENT DOCUMENTS

| | | |
|---|---|---|
| JP | 2005-38425 A | 2/2005 |
| JP | 2005-242642 A | 9/2005 |
| JP | 2007-122657 A | 5/2007 |
| JP | 2008-140380 A | 6/2008 |
| JP | 2010-277350 A | 12/2010 |

OTHER PUBLICATIONS

Hiroshi Sasaki et al., "Dynamic Voltage Scaling Method Based on Statistical Analysis", Information Processing Society of Japan, vol. 47, No. SIG 18(ACS 16), pp. 80-91, Nov. 2006.

Kihwan Choi, et al., "Fine-Grained Dynamic Voltage and Frequency Scaling for Precise Energy and Performance Trade-off based on the Ratio of off-chip Access to On-chip Computation Times"; Proceedings of the Design, Automation and Test in Europe Conference and Exhibition, pp. 4-9, 2004.

Japanese Office Action mailed Mar. 17, 2015 for corresponding Japanese Patent Application No. 2011-158478, with Partial English Translation, 4 pages.

* cited by examiner

| APPLICATION NAME | CPU FREQUENCY-DEPENDENT RATE [%] | (AVERAGE) POWER CONSUMPTION OF MEMORY [Watt] |
| --- | --- | --- |
| 444.namd | 99.8 | 17.4 |
| 471.omnetpp | 33.0 | 26.0 |
| 429.mcf | 31.3 | 28.8 |
| 450.soplex | 27.5 | 30.4 |
| 433.milc | 14.9 | 33.8 |
| 437.leslie3d | 15.3 | 34.6 |
| 459.GemsFDTD | 4.8 | 35.4 |

| POWER CONSUMPTION OF MEMORY [Watt] | OPERATING FREQUENCY [KHz] |
| --- | --- |
| LESS THAN 17.4 | 2,926,000 |
| EQUAL TO OR GREATER THAN 17.4 AND LESS THAN 26.0 | 2,660,000 |
| 26.0 OR MORE | 1,596,000 |

FIG.6

| APPLICATION NAME | (AVERAGE) POWER CONSUMPTION OF MEMORY [Watt] | OPERATING FREQUENCY AT WHICH POWER CONSUMPTION IS MINIMIZED [KHz] |
|---|---|---|
| 444.namd | 17.4 | 2,660,000 |
| 471.omnetpp | 26.0 | 1,596,000 |
| 429.mcf | 28.8 | 1,596,000 |
| 450.soplex | 30.4 | 1,596,000 |
| 433.milc | 33.8 | 1,596,000 |
| 437.leslie3d | 34.6 | 1,596,000 |
| 459.GemsFDTD | 35.4 | 1,596,000 |

FIG.9

DYNAMICALLY ADJUSTING OPERATING FREQUENCY OF A ARITHEMATIC PROCESSING DEVICE FOR PREDETERMINED APPLICATIONS BASED ON POWER CONSUMPTION OF THE MEMORY IN REAL TIME

CROSS-REFERENCE TO RELATED APPLICATION

This application is based upon and claims the benefit of priority of the prior Japanese Patent Application No. 2011-158478, filed on Jul. 19, 2011, the entire contents of which are incorporated herein by reference.

FIELD

The embodiments discussed herein are directed to an information processing apparatus, a control program, and a control method.

BACKGROUND

Conventionally, a DVFS (Dynamic Voltage and Frequency Scaling) technique dynamically changing an operating frequency of a CPU (Central Processing Unit) is known. An information processing apparatus, to which such a technique is applied, can reduce power consumption of the CPU by lowering an operating frequency of the CPU and a voltage applied to the CPU.

As an example of such an information processing apparatus, there is a known information processing apparatus to which an Ondemand Governor technique changing an operating frequency of a CPU according to CPU utilization per unit time is applied. In the case where the CPU utilization per unit time is lower than a predetermined threshold value, such an information processing apparatus can reduce power consumption of the CPU by setting the operating frequency of the CPU to a frequency lower than a predetermined frequency.

Herein, in the case of lowering the operating frequency when the CPU utilization is higher than the predetermined threshold value, the power consumption is reduced but an application execution time is prolonged due to performance degradation. Hence, power consumption for executing application will increase. Therefore, in the case where the CPU utilization per unit time is higher than the predetermined threshold value, the information processing apparatus prevents performance degradation by setting the frequency of the CPU to a frequency higher than the predetermined frequency.

However, since the operating frequency is set to a high frequency when the CPU utilization is higher than the predetermined threshold value, the above-described technique changing the operating frequency of the CPU according to the CPU utilization per unit time has a problem that does not reduce power consumption of the CPU.

SUMMARY

According to an aspect of an embodiment of the invention, an information processing apparatus includes a memory that stores information used for arithmetic processing. The information processing apparatus includes an arithmetic processing unit that operates arithmetic processing by using the information stored in the memory. The information processing apparatus includes a measuring unit that measures power consumption of the memory. The information processing apparatus includes a setting unit that sets an operating frequency of the arithmetic processing unit according to the power consumption measured by the measuring unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

An information processing apparatus, a control program, and a control method according to the present application will be described below with reference to the accompanying drawings.

[a] First Embodiment

Figure 1:
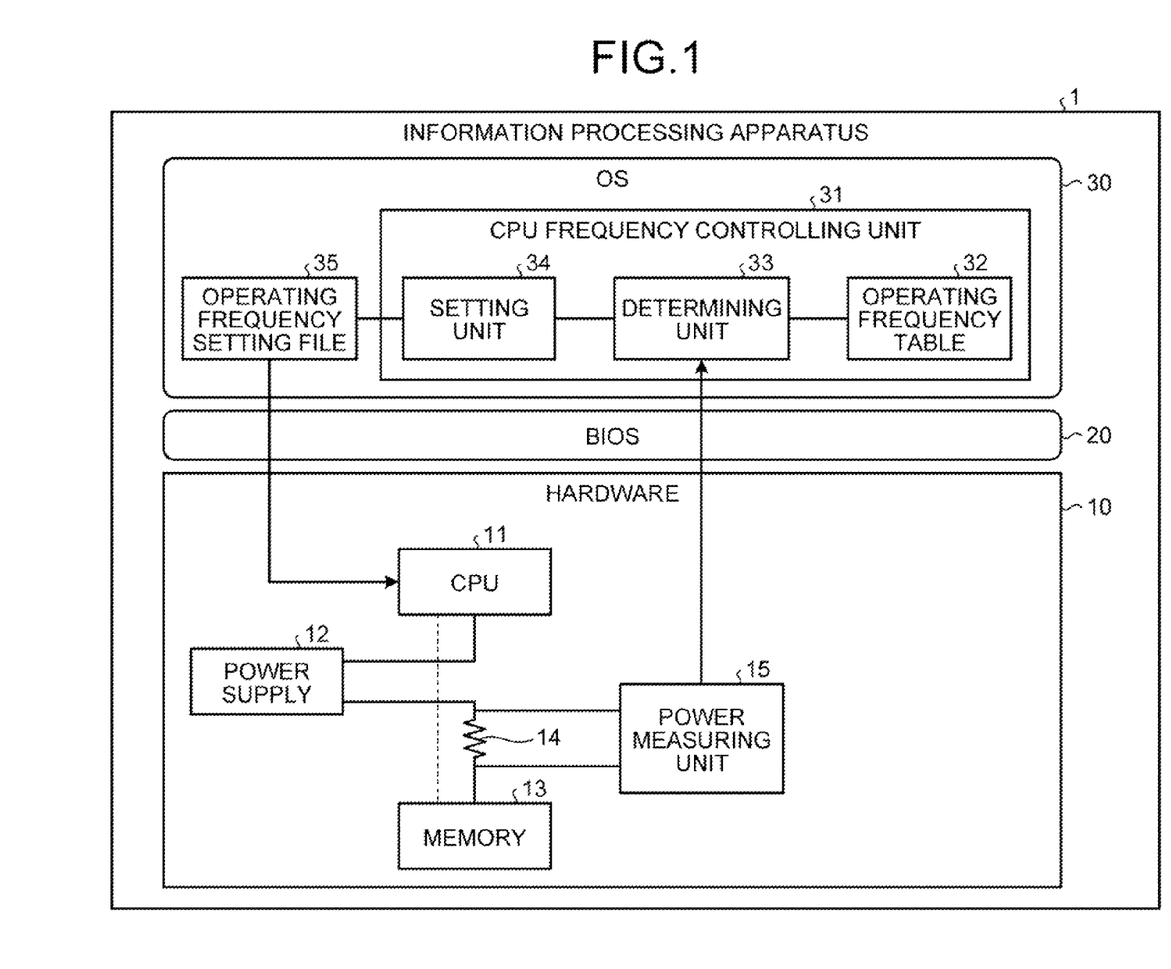
FIG. 1 is a diagram illustrating an example of an information processing apparatus according to a first embodiment.

In a following first embodiment, an example of an information processing apparatus will be described with reference to FIG. 1. FIG. 1 is a diagram illustrating an example of an information processing apparatus according to the first embodiment.

As illustrated in FIG. 1, an information processing apparatus 1 includes a hardware 10 and executes a BIOS (Basic Input/Output System) 20 and an OS (Operating System) 30. The hardware 10 includes a CPU (Central Processing Unit) 11, a power supply 12, a memory 13, a resistor 14, and a power measuring unit 15.

Also, the OS 30 includes a CPU frequency controlling unit 31 and an operating frequency setting file 35. Furthermore, the CPU frequency controlling unit 31 includes an operating frequency table 32, a determining unit 33, and a setting unit 34. Moreover, the BIOS 20 is a type of firmware and is a program that executes the lowest-level input/output to/from the hardware among programs installed on the computer. A description thereof will not be repeated below.

First, the CPU 11, the power supply 12, the memory 13, the resistor 14, the power measuring unit 15, which are included in the hardware 10, will be described. The CPU 11 includes a cache and performs arithmetic processing by using information stored in the cache or information stored in the memory 13.

Specifically, the CPU 11 receives power from the power supply 12 and performs arithmetic processing related to application execution. Also, in the case where information used for the arithmetic processing is stored in the cache of the CPU 11, the CPU 11 performs the arithmetic processing by using the information stored in the cache. Also, in the case where the information used for the arithmetic processing is not stored in the cache of the CPU 11, the CPU 11 accesses the memory 13 and acquires the information used for the arithmetic processing from the memory 13. The CPU 11 stores the acquired information in its own the cache and also performs the arithmetic processing related to the application execution by using the acquired information.

Also, the CPU 11 is an arithmetic processing unit configured to be operable at a plurality of operating frequencies. That is, a DVFS (Dynamic Voltage and Frequency Scaling) technique is embedded in the CPU 11. Whenever a predetermined period of time has elapsed, the CPU 11 refers to the operating frequency setting file 35 included in the OS 30, and changes the operating frequency of the CPU 11 according to information indicated by the referred operating frequency setting file 35.

For example, the CPU 11 can perform the arithmetic processing at any one operating frequency among 2,926,000 kHz, 2,660,000 kHz, 2,394,000 kHz, 2,128,000 kHz, 1,862,000 kHz, and 1,596,000 kHz as the operating frequency of the CPU 11. In the case where the CPU 11 refers to the operating frequency setting file 35 and the referred operating frequency setting file 35 indicates 2,626,000 kHz, the CPU 11 sets the operating frequency thereof to 2,626,000 kHz and performs the arithmetic processing at the set operating frequency. Also, for example, in the case where the operating frequency setting file 35 indicates 1,596,000 kHz, the CPU 11 sets the operating frequency thereof to 1,596,000 kHz and performs the arithmetic processing at the set operating frequency.

The power supply 12 is a power supplying unit configured to supply power to each component included in the hardware 10. For example, upon receiving a voltage applied from the outside of the information processing apparatus 1, the power supply 12 performs supply of power by transforming the voltage into a voltage appropriate for the CPU 11 or the memory 13 and applying the transformed voltage to the CPU 11 or the memory 13.

The memory 13 is a storage device configured to store information used by the CPU 11 for performing the arithmetic processing. Also, the memory 13 consumes power supplied from the power supply 12 whenever reading or writing information.

The resistor 14 is a minute resistor installed to measure power supplied to the memory 13. The power measuring unit 15 obtains power consumed by the memory 13 by using a current calculated from a potential difference occurring between both ends of the resistor 14 and a resistance value, and a voltage between the memory 13 and the resistor 14. Then, the power measuring unit 15 transmits the measured voltage value to the determining unit 33 included in the CPU frequency controlling unit 31.

Such the hardware 10 executes the application while the CPU 11 uses the information stored in the memory 13. Therefore, the CPU 11 and the memory 13 consume power according to the application execution. Herein, the power consumed by the CPU 11 is expressed as the product of the operating frequency and the square of the voltage. The electric energy consumed when the CPU 11 executes the application is expressed as the product of the power consumed by the CPU 11 and time of executing the application.

Meanwhile, as the application the CPU 11 executes, there exist an application in which time of executing the application is changed, and an application in which time of executing the application does not much change, in the case where the operating frequency of the CPU 11 is changed. That is, as the application the CPU 11 executes, there exist an application whose performance is dependent on the operating frequency of the CPU 11, and an application whose performance is not much dependent on the operating frequency of the CPU 11.

Figure 2:
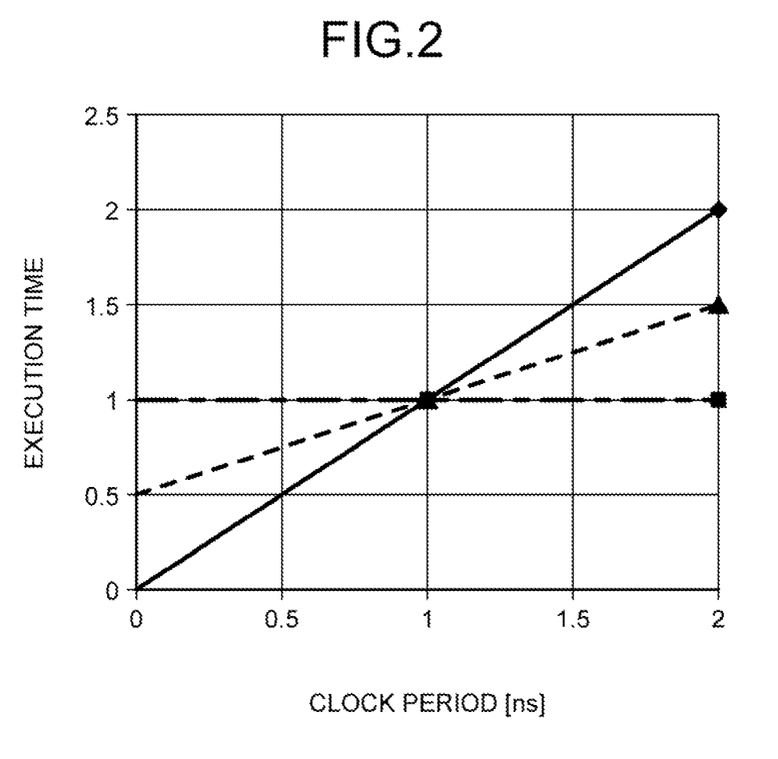
FIG. 2 is a diagram illustrating a relation between a frequency-dependent rate and an execution time.

FIG. 2 is a diagram illustrating a relation between a frequency-dependent rate and an execution time. Also, the frequency-dependent rate is a ratio of an increasing rate of an application execution time to an increasing rate of a clock period when the application is executed at two different operating frequencies.

The example illustrated in FIG. 2 plots an application execution time having different frequency-dependent rates are executed at different clock periods, where the clock period (ns: Nano Second) is represented along a transverse axis and the execution time is represented along a longitudinal axis. Also, the example illustrated in FIG. 2 plots the ratio of application execution time for each application in the case where the application execution time when the clock period is 1 ns (the operating frequency is 1 GHz) is assumed to be 1. Also, in the example illustrated in FIG. 2, a line representing a relation between a clock period and an execution time with respect to an application having a 100 percent frequency-dependent rate is indicated by a straight line, and a line representing a relation between a clock period and an execution time with respect to an application having a 50 percent frequency-dependent rate is indicated by a dashed line. Also, in the example illustrated in FIG. 2, a line representing a relation between a clock period and an execution time with respect to an application having a 0 percent frequency-dependent rate is indicated by a broken line.

As illustrated in FIG. 2, in the case of the application having the 100 percent frequency-dependent rate, if the clock period is increased by, for example, two times (that is, the frequency is 500 MHz), the execution time is increased by two times. On the other hand, in the case of the application having the 0 percent frequency-dependent rate, even if the clock period is increased by two times, the execution time is not increased. Also, in the case of the application having the 50 percent frequency-dependent rate, if the clock period is increased by two times, the execution time is increased by 1.5 times.

That is, in the case of lowering the operating frequency when executing the application whose performance is dependent on the operating frequency, the CPU 11 prolongs the application execution time. Therefore, in the case of lowering the operating frequency when executing the application whose performance is dependent on the operating frequency, the CPU 11 will increase the consumption of electric energy. Therefore, in the case of executing the application whose performance is dependent on the operating frequency, the CPU 11 does not lower the operating frequency.

Also, even if the CPU 11 lowers the operating frequency when executing the application whose performance is not much dependent on the operating frequency, the application execution time does not much change. As a result, in the case where the CPU 11 executes the application whose performance is not much dependent on the operating frequency, the CPU 11 can reduce power consumption by lowering the operating frequency.

Next, in the case where the operating frequency of the CPU 11 is changed, the application whose performance is not much dependent on the operating frequency and the application whose performance is dependent on the operating frequency will be described. For example, the application whose performance is not much dependent on the operating frequency corresponds to an application that accesses the memory 13 many times during execution.

That is, the operating frequency of the memory 13 is set to a value independent of the operating frequency of the CPU 11. Also, the operating frequency of the memory 13 is generally set to a value lower than the operating frequency of the CPU 11. Therefore, the performance of the application that accesses the memory 13 many times is determined by the performance of the memory 13. Therefore, even if the operating frequency of the CPU 11 is lowered when the application that accesses the memory 13 many times is executed, the performance is not degraded so much. Thus, it can be said that the performance of the application is not much dependent on the operating frequency.

On the other hand, the application whose performance is dependent on the operating frequency corresponds to an application that less accesses the memory 13 during execution. That is, since the application that less accesses the memory 13 is high in a hit rate of the cache included in the CPU 11, the performance of the application is exhibited depending on the operating frequency. Therefore, it can be said that the application that less accesses the memory 13 is an application whose performance is dependent on the operating frequency of the CPU 11.

Herein, the memory 13 consumes power according to the number of times of access. That is, in the case where the number of times of access is larger than usual, the memory 13 consumes more power than usual. In the case where the number of times of access is smaller than usual, the memory 13 consumes less power than usual.

Therefore, in the case where power consumption of the memory 13 is larger than usual, the CPU 11 determines that the application whose performance is not significantly degraded even though the operating frequency is reduced, that is, the application whose performance is not dependent on the operating frequency is executed. In such a case, the CPU 11 reduces the power consumption by lowering the operating frequency, without significantly degrading the performance of the application.

On the other hand, in the case where the power consumption of the memory 13 is smaller than usual, the CPU 11 determines that the application whose performance is reduced when the operating frequency is lowered, that is, the application whose performance is dependent on the operating frequency is executed. In such a case, since the CPU 11 does not lower the operating frequency, the CPU 11 can execute the application without degrading performance.

Figure 3:
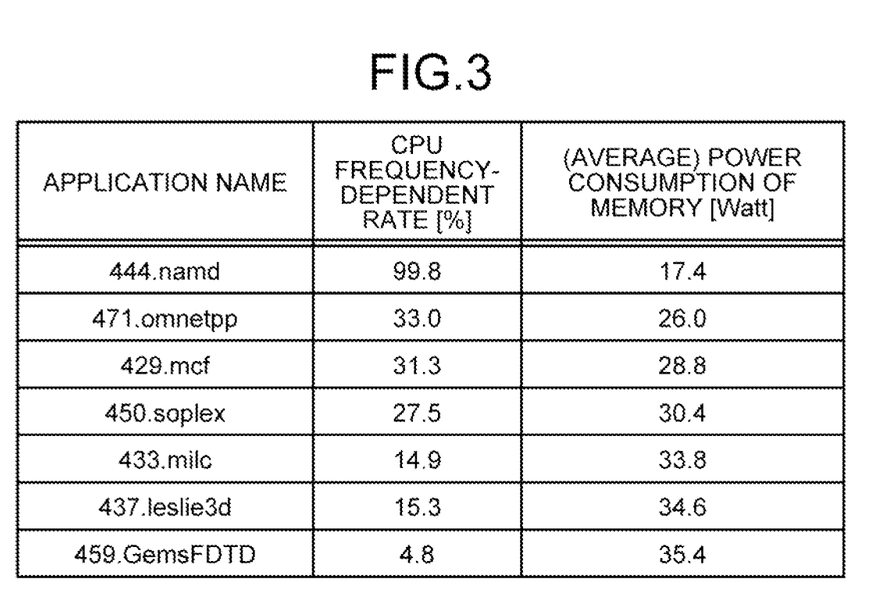
FIG. 3 is a diagram illustrating an example of a relation between a CPU frequency-dependent rate and power consumption of a memory.

Herein, an example of a relation between the power consumption of the memory 13 during the application execution and the CPU frequency-dependent rate of the application will be described. FIG. 3 is a diagram illustrating an example of a relation between a CPU frequency-dependent rate of each application and power consumption. FIG. 3 illustrates an application name executed by the CPU 11, a CPU frequency-dependent rate of each application, and an average values (Watt) of the power consumed by the memory 13 when the CPU 11 executes each application.

Also, the example illustrated in FIG. 3 was measured by applying Xeon X5570 to the CPU 11 and applying a 1333-M (Mega) Hz DDR3 (Double-Data-Rate3 Synchronous Dynamic Random Access Memory) having a capacity of 12 GB (Giga Bytes) to the memory 13. Moreover, CentOS5.5 was applied to the OS 30.

Specifically, the example illustrated in FIG. 3 illustrates that the CPU frequency-dependent rate of the application name "444.namd" is "99.8(%)", and the average power consumption of the memory is "17.4 (W)". Also, it is illustrated that the CPU frequency-dependent rate of the application name "471.omnetpp" is "33.0(%)", and the average power consumption of the memory is "26.0 (W)". Also, it is illustrated that the CPU frequency-dependent rate of the application name "429.mcf" is "31.3(%)", and the average power consumption of the memory is "28.8 (W)".

Also, it is illustrated that the CPU frequency-dependent rate of the application name "450.soplex" is "27.5(%)", and the average power consumption of the memory is "30.4 (W)". Also, it is illustrated that the CPU frequency-dependent rate of the application name "433.milc" is "14.9(%)", and the average power consumption of the memory is "33.8 (W)". Also, it is illustrated that the CPU frequency-dependent rate of the application name "437.leslie3d" is "15.3(%)", and the average power consumption of the memory is "34.6 (W)". Also, it is illustrated that the CPU frequency-dependent rate of the application name "459.GemsFDTD" is "4.8(%)", and the average power consumption of the memory is "35.4 (W)".

Herein, the CPU frequency-dependent rate of each application and the power consumption of the memory, which are illustrated in FIG. 3, have a negative correlation, and its value is about "−0.96". Therefore, the information processing apparatus 1 can control the operating frequency according to the CPU frequency-dependent rate of the application by controlling the operating frequency of the CPU 11 according to the power consumption of the memory 13, even without pre-analyzing the CPU frequency-dependent rate of the application. As a result, the information processing apparatus 1 can easily reduce the power consumption of the CPU 11.

Next, the operating frequency table 32, the determining unit 33, and the setting unit 34, which are included in the CPU frequency controlling unit 31, will be described. The operating frequency table 32 stores information indicating the power consumption of the memory 13 and information indicating the operating frequency of the CPU 11 in correspondence to each other. Specifically, the operating frequency table 32 stores information indicating the power consumption ranges of the memory 13 and information indicating the operating frequencies of the CPU 11 in correspondence to each other.

Figure 4:
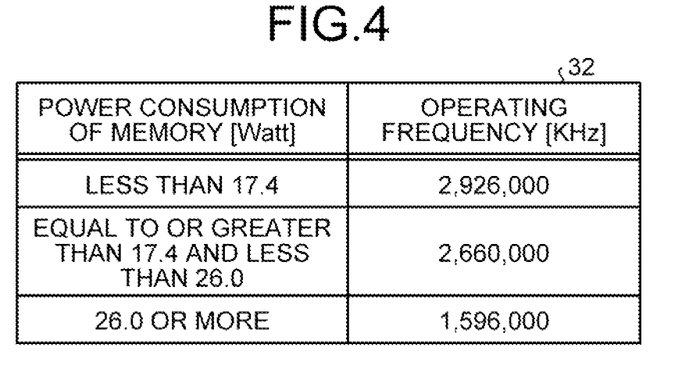
FIG. 4 is a diagram illustrating an example of an operating frequency table.

For example, FIG. 4 is a diagram illustrating an example of the operating frequency table. In the example illustrated in FIG. 4, the operating frequency table 32 stores the power consumptions of the memory and the operating frequencies in correspondence to each other. Specifically, the operating frequency table 32 stores information indicating "less than 17.4 (Watt)" and information indicating "2,926,000 (kHz)" in correspondence to each other. Also, the operating frequency table 32 stores information indicating "equal to or greater than 17.4 (Watt) and less than 26.0 (Watt)" and information indicating "2,660,000 (kHz)" in correspondence to each other. Also, the operating frequency table 32 stores information indicating "26.0 (Watt) or more" and information indicating "1,596,000 (kHz)" in correspondence to each other.

Returning back to FIG. 1, the operating frequency setting file 35 is a file configured to store information indicating the operating frequency of the CPU 11. For example, the operating frequency setting file 35 stores information indicating that the operating frequency of the CPU 11 is set to "2,926,000 (kHz)".

The determining unit 33 sets the operating frequency of the CPU 11 according to the power consumption of the memory 13, which is measured by the power measuring unit 15. Specifically, in the case where the power consumption of the memory, which is measured by the power measuring unit 15, is higher than a predetermined threshold value, the determining unit 33 informs the setting unit 34 of the operating frequency lower than a predetermined operating frequency. Also, in the case where the power consumption of the memory 13, which is measured by the power measuring unit 15, is lower than the predetermined threshold value, the determining unit 33 informs the setting unit 34 of the operating frequency higher than the predetermined operating frequency.

Next, an example of the processing performed by the determining unit 33 will be described. For example, the determining unit 33 receives power consumption values from the power measuring unit 15 at time intervals shorter than 1 second. Then, the determining unit 33 calculates an average value of the power consumption values received for the past 1 second. In addition, the determining unit 33 refers to the operating frequency table 32 and determines which power consumption range the calculated average value falls within among the power consumption ranges stored in the operating frequency table 32.

Then, the determining unit 33 determines information indicating the range covering the calculated average value and information indicating the corresponding operating frequency, among the information indicating the power consumption ranges stored in the operating frequency table 32. Thereafter, the determining unit 33 sends the information indicating the determined operating frequency to the setting unit 34.

The setting unit 34 sets the operating frequency of the CPU 11 to the operating frequency that is indicated by the information determined by the determining unit 33. Specifically, the setting unit 34 receives the information indicating the operating frequency from the determining unit 33. Then, the setting unit 34 updates the information stored in the operating frequency setting file 35 with the received information indicating the operating frequency.

By performing such processing, the CPU frequency controlling unit 31 can reduce power consumed by the CPU 11. That is, the CPU frequency controlling unit 31 determines whether the running application is an application dependent on the operation frequency, based on the power consumption of the memory 13.

Then, in the case where the CPU frequency controlling unit 31 determines that the running application is not the application dependent on the operating frequency, the CPU frequency controlling unit 31 reduces the power consumption of the CPU 11 by lowering the operating frequency of the CPU 11. On the other hand, in the case where the CPU frequency controlling unit 31 determines that the running application is the application dependent on the operating frequency, the CPU frequency controlling unit 31 prevents the performance degradation of the application by setting the operating frequency of the CPU 11 to a normal value or a value greater than the normal value, instead of lowering the operating frequency of the CPU 11.

Figure 5:
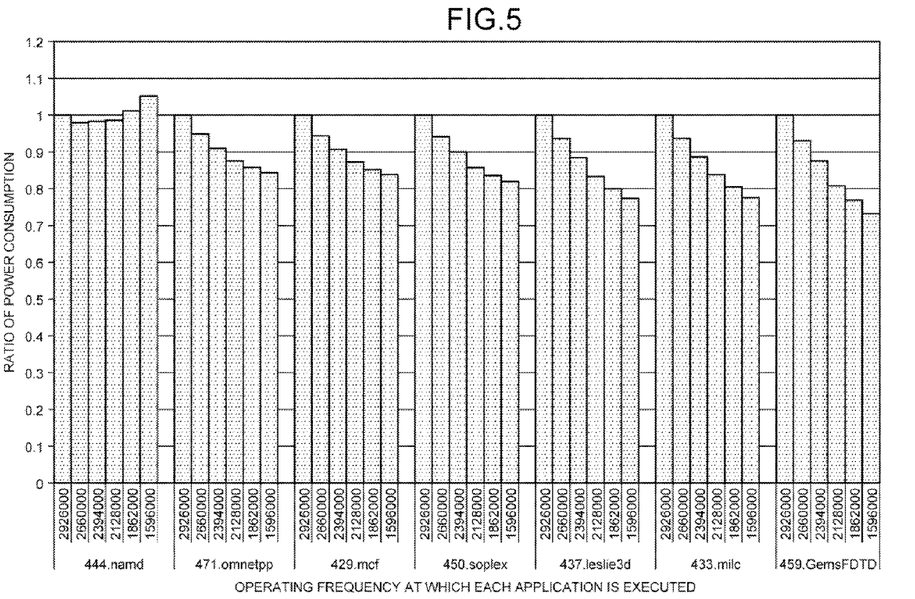
FIG. 5 is a diagram illustrating power consumption of a CPU when an application is executed at each operating frequency.

Next, the processing of determining a set of the power consumption of the memory and the operating frequency of the CPU 11, which are stored in the operating frequency table 32, will be described. FIG. 5 is a diagram illustrating the power consumption of the CPU when the application is executed at each operating frequency. Also, in FIG. 5, the operating frequency of the CPU 11 when the application was executed is represented along a transverse axis, and the power consumption of the CPU 11 for executing the application when the operating frequency of the CPU 11 was set to each operating frequency is represented along a longitudinal axis.

Also, the example illustrated in FIG. 5 illustrates the ratio of the power consumption of the CPU 11 for executing the each application, when the power consumption was assumed to be "1" in the case where the operating frequency of the CPU 11 was "2,926,000 (kHz)".

Specifically, the example illustrated in FIG. 5 illustrates the ratio of the power consumption of the CPU 11 when each application was executed at the operating frequency of the CPU 11 set to "2,926,000 (kHz)", "2,660,000 (kHz)", and "2,394,000 (kHz)". Also, the example illustrated in FIG. 5 illustrates the ratio of the power consumption of the CPU 11 for executing the application at the operating frequency of the CPU 11 set to "2,128,000 (kHz)", "1,862,000 (kHz)", and "1,596,000 (kHz)".

Also, the example illustrated in FIG. 5 illustrates the ratio of the power consumption of the CPU 11 when "444.namd", "471.omnetpp", and "429.mcf" were executed. Also, the example illustrated in FIG. 5 illustrates ratio of the power consumption of the CPU 11 when "450.soplex", "437.leslie3d", "433.milc", and "459.GemsFDTD" were executed.

As illustrated in FIG. 5, in the case of "444.namd", the power consumption is not significantly reduced when the operating frequency of the CPU 11 is lowered. On the other hand, in the case of another applications "471.omnetpp", "429.mcf", and "450.soplex", the power consumption is reduced when the operating frequency of the CPU 11 is lowered. Moreover, in the case of "437.leslie3d", "433.milc", and "459.GemsFDTD", the power consumption is reduced when the operating frequency of the CPU 11 is lowered.

Figure 6:
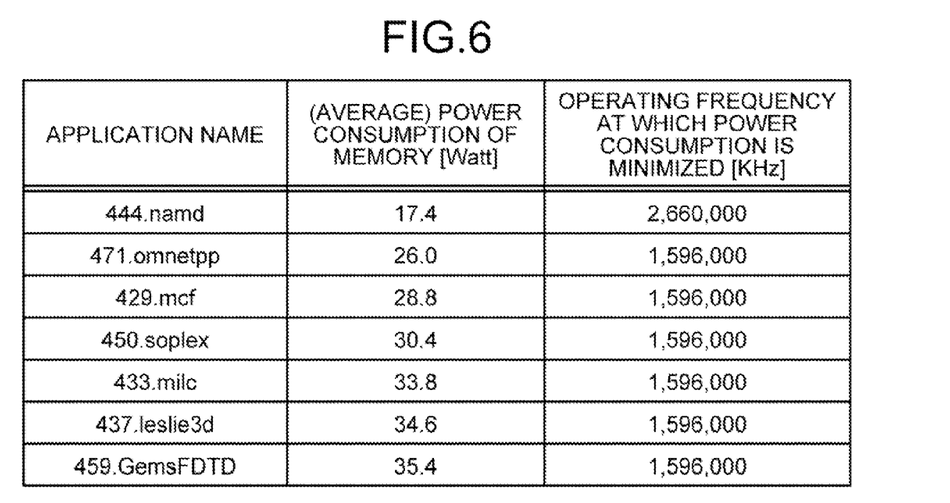
FIG. 6 is a diagram illustrating a relation between an application and an operating frequency at which power consumption is minimized.

FIG. 6 is a diagram illustrating a relation between the application and the operating frequency at which the power consumption is minimized. The example illustrated in FIG. 6 illustrates each application name, the average power consumption of the memory 13 when each application was executed, and the operating frequency at which the power consumption of the CPU 11 was minimized. Herein, for each application name, the operating frequency, illustrated in FIG. 6, at which the power consumption is minimized, is identical to the operating frequency, illustrated in FIG. 5, at which the ratio of the power consumption of the CPU 11 is minimized. Also, the average power consumption of the memory 13 illustrated in FIG. 6 is identical to the average power consumption of the memory 13 illustrated in FIG. 3.

As illustrated in FIG. 6, in the case where the application "444.namd" is executed, the power consumption of the CPU 11 is minimized when the operating frequency of the CPU 11 is "2,660,000 (kHz)". Also, in the case where another application is executed, the power consumption of the CPU 11 is minimized when the operating frequency of the CPU 11 is "1,596,000 (kHz)". Therefore, the information processing apparatus 1 has to set the operating frequency of the CPU 11 to "1,596,000 (kHz)" when the average power consumption of the memory 13 is "26.0 (W)" or more.

Meanwhile, in the example illustrated in FIG. 6, when the application "444.namd" is executed, the average power consumption of the memory 13 is "17.4 (W)", and the operating frequency at which the power consumption of the CPU 11 is minimized is "2,660,000 (kHz)". Therefore, the information processing apparatus 1 has to set the operating frequency of the CPU 11 to "2,660,000 (kHz)" when the average power consumption of the memory 13 is "17.4 (W)".

However, in the example illustrated in FIG. 6, when the average power consumption of the memory 13 is "17.4 (W) to 26.0 (W)", the operating frequency at which the power consumption of the CPU 11 is minimized is unobvious. That is, it is unobvious at which operating frequency the power consumption of the CPU 11 is minimized among "2,660,000 (kHz)" to "1,596,000 (kHz)". Also, in the example illustrated in FIG. 6, when the average power consumption of the memory 13 is "17.4 (W)" or less, it is unobvious whether the operating frequency of the CPU 11 has to be set to "2,926,000 (kHz)" or "2,660,000 (kHz)".

However, in the case where the operating frequency of the CPU 11 is set to a low value when the application having a high frequency-dependent rate is executed, the execution time is prolonged due to the performance degradation of the application, and the power consumption of the CPU 11 is increased. Therefore, in the case where the operating frequency having to be set to the CPU 11 is unobvious, the operating frequency has to be set to a value as high as possible.

Therefore, the information processing apparatus 1 includes the operating frequency table 32 indicating that the operating frequency is set to "2,660,000 (kHz)" when the average power consumption of the memory 13 is "equal to or greater than 17.4 (W) and less than 26.0 (W)". Also, the information processing apparatus 1 sets the operating frequency to "2,926,000 (kHz)" when the average power consumption of the memory 13 is less than "17.4 (W)".

Figure 7:
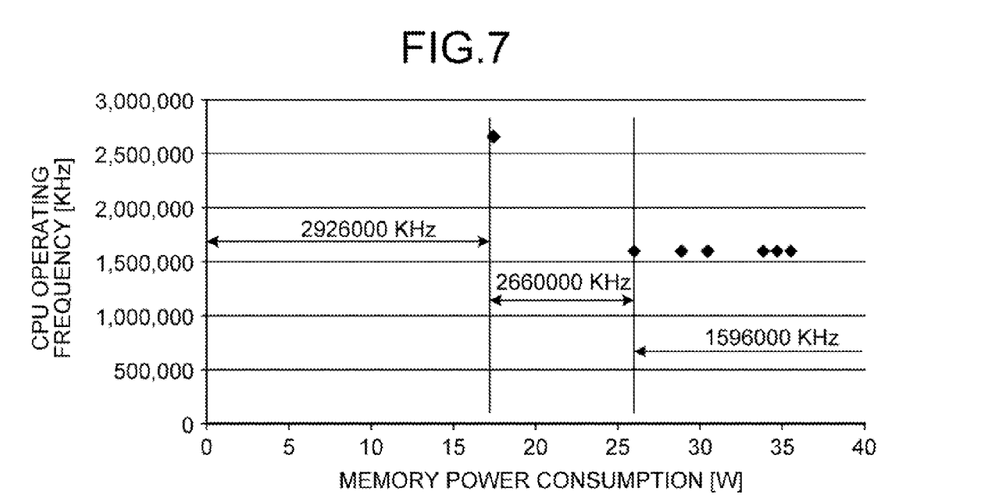
FIG. 7 is a diagram illustrating an example of a relation between power consumption of a memory and a set operating frequency of a CPU.

FIG. 7 is a diagram illustrating an example of a relation between the power consumption of the memory and the set operating frequency of the CPU. The example illustrated in FIG. 7 plots the power consumption of the memory 13 during the execution of each application illustrated in FIG. 6 and the operating frequency at which the power consumption of the CPU 11 is minimized, where the power consumption of the memory is represented along a transverse axis and the operating frequency of the CPU is represented along a longitudinal axis.

As illustrated in FIG. 7, it is obvious that when the power consumption of the memory 13 is "26.0 (W)" or more, the information processing apparatus 1 has to set the operating frequency of the CPU 11 to "1,596,000 (kHz)". Herein, when the average power consumption of the memory 13 is "17.4 (W) to 26.0 (W)", the operating frequency at which the power consumption of the CPU 11 is minimized is unobvious.

However, the information processing apparatus 1 has to set the operating frequency of the CPU 11 to a value as high as possible. Therefore, the information processing apparatus 1 includes the operating frequency table 32 indicating that the operating frequency is set to "2,660,000 (kHz)" when the average power consumption of the memory 13 is "equal to or greater than 17.4 (W) and less than 26.0 (W)". Also, the information processing apparatus 1 includes the operating frequency table 32 indicating that the operating frequency is set to "2,926,000 (kHz)" when the average power consumption of the memory 13 is less than "17.4 (W)".

As described above, the information processing apparatus 1 includes the operating frequency table 32 regarding the power consumption of the memory 13 that is measured at a predetermined operating frequency, and the operating frequency at which the power consumption of the CPU 11 during execution is minimized, with respect to a plurality of applications. Therefore, the information processing apparatus 1 can reduce the electric energy consumed by the CPU 11.

Flow of Processing of Information Processing Apparatus

Figure 8:
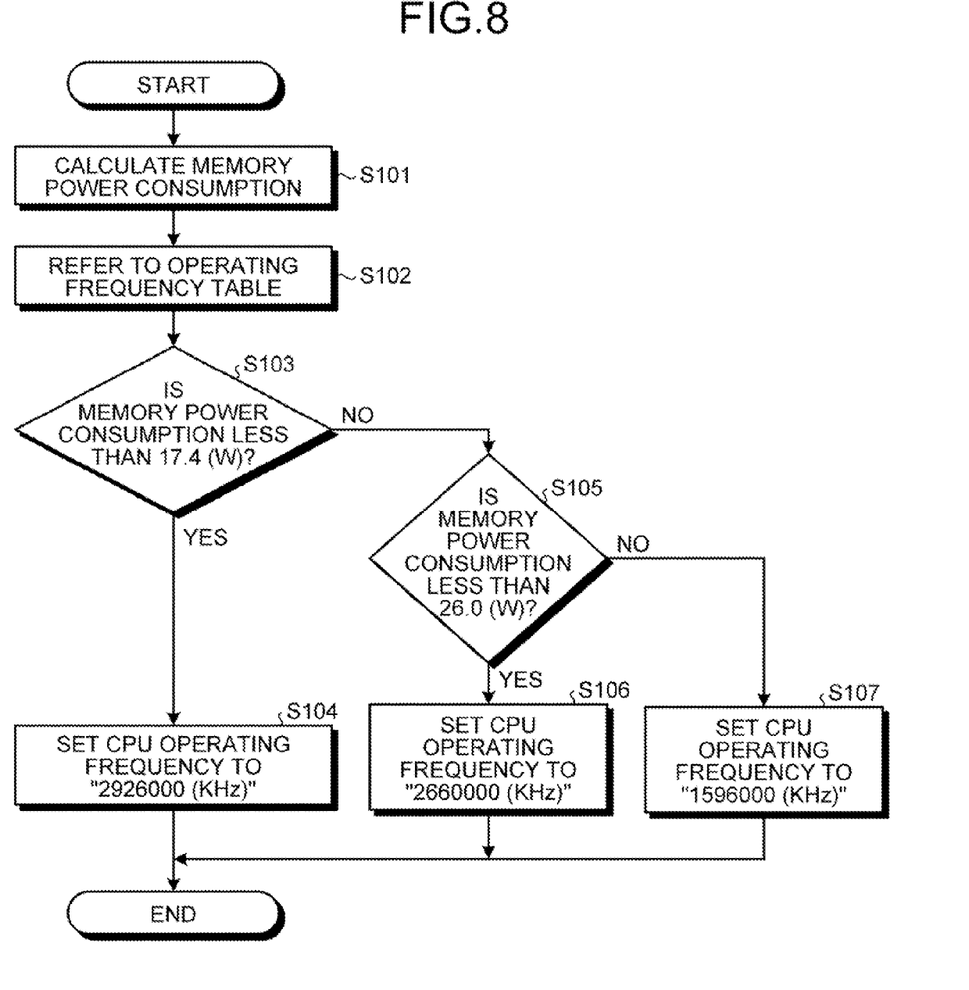
FIG. 8 is a flowchart illustrating an example of processing performed by the information processing apparatus according to the first embodiment.

Next, an example of a flow of processing to be performed by the information processing apparatus 1 will be described with reference to FIG. 8. FIG. 8 is a flowchart illustrating an example of processing to be performed by the information processing apparatus according to the first embodiment. Also, the information processing apparatus 1 performs the processing illustrated in FIG. 8 at intervals of 1 second.

First, the information processing apparatus 1 calculates an average value of power consumed by the memory 13 for the past 1 second in step S101. Then, the information processing apparatus 1 refers to the operating frequency table 32 in step S102 and performs the subsequent steps S103 to S107.

That is, the information processing apparatus 1 determines whether the average value of the power consumed by the memory 13 is less than 17.4 (W) in step S103. When it is determined that the average value of the power consumed by the memory 13 is less than 17.4 (W) (YES in step S103), the information processing apparatus 1 sets the operating frequency of the CPU 11 to "2926000 (kHz)" in step S104 and ends the processing.

Meanwhile, when it is determined that the average value of the power consumed by the memory 13 is equal to or greater than 17.4 (W) (NO in step S103), the information processing apparatus 1 determines whether the average value of the power consumed by the memory 13 is less than 26.0 (W) in step S105. When it is determined that the average value of the power consumed by the memory 13 is less than 26.0 (W) (YES in step S105), the information processing apparatus 1 sets the operating frequency of the CPU 11 to "2660000 (kHz)" in step S106 and ends the processing.

Also, when it is determined that the average value of the power consumed by the memory 13 is equal to or greater than 26.0 (W) (NO in step S105), the information processing apparatus 1 sets the operating frequency of the CPU to "1596000 (kHz)" in step S107 and ends the processing.

Effects of First Embodiment

As described above, the information processing apparatus 1 includes the CPU 11, which can set the operating frequency, and the memory 13, and measures the power consumption of the memory 13. Then, the information processing apparatus 1 sets the operating frequency of the CPU 11 according to the measured power. Therefore, the information processing apparatus 1 can reduce the electric energy consumed by the CPU 11 even when the utilization of the CPU 11 is high.

Also, in the case where the power consumption of the memory 13 is larger than a predetermined threshold value, the information processing apparatus 1 sets the operating frequency of the CPU 11 to a value lower than a predetermined frequency. In the case where the power consumption of the memory 13 is smaller than the predetermined threshold value, the information processing apparatus 1 sets the operating frequency of the CPU 11 to a value high than the predetermined frequency. Therefore, even when the utilization of the CPU 11 is high due to the application, the information processing apparatus 1 can reduce the power consumption of the CPU 11, without significantly degrading the performance of the application.

Also, the information processing apparatus 1 includes the operating frequency table 32 configured to store information regarding a plurality of information indicating power consumption ranges and a plurality of information indicating operating frequencies in correspondence to each other. The information processing apparatus 1 sets the operating frequency stored in the operating frequency table 32, as the operating frequency of the CPU 11, according to the information indicating the range covering the measured power consumption of the memory 13. Therefore, the information processing apparatus 1 can quickly set the operating frequency to the CPU 11.

Also, the information processing apparatus 1 includes the operating frequency table 32 configured to store the operating frequency at which the power consumption of the CPU 11 is minimized when the application is executed, and the power consumption of the memory 13 when the application is executed at a predetermined operating frequency in correspondence to each other. Therefore, the information processing apparatus 1 can set a pre-analyzed optimal operating frequency to the CPU 11.

Also, the information processing apparatus 1 calculates the average value of the power consumed by the memory 13 from the setting of the operating frequency of the CPU 11 to the elapse of a predetermined time, and newly sets the operating frequency of the CPU 11 according to the calculated average value of the power. Therefore, even if the application executed by the CPU 11 frequently changes, the information processing apparatus 1 can set the operating frequency that can efficiently reduce the electric energy consumed by the CPU 11.

Also, the information processing apparatus 1 includes the CPU 11 that refers to the operating frequency setting file 35 at predetermined time intervals and performs arithmetic processing at the operating frequency indicated by the operating frequency setting file 35. The information processing apparatus 1 outputs the operating frequency setting file 35 indicating the operating frequency set to the CPU 11. Therefore, the information processing apparatus 1 can easily set the operating frequency of the CPU 11.

Also, in order to optimize the operating frequency of the CPU 11, an information processing apparatus, to which the following technology is applied, is also considered. That is, the information processing apparatus divides source codes of the application into a plurality of areas, and pre-analyzes an efficient operating frequency, based on information collected by a performance counter during the execution of each divided area and an evaluation made by a model formula. When executing the application, such an information processing apparatus sets the operating frequency of the CPU to the pre-analyzed operating frequency.

However, the technology of dividing such an application into a plurality of areas and pre-analyzing an efficient operating frequency for each area has a problem that a plurality of efficient operating frequencies for applications are pre-analyzed using the same technique. Therefore, if an application is added, it takes a time to perform the analysis of the application.

Meanwhile, even though not pre-analyzing the application, the information processing apparatus 1 according to the first embodiment can optimize the operating frequency of the CPU 11, without degrading the performance of the application, by merely measuring the power consumption of the memory 13. As a result, the information processing apparatus 1 can easily reduce the power consumed by the CPU 11.

Also, even though not using the performance counter, the information processing apparatus 1 can determine the operating frequency, which has to be set to the CPU 11, by merely measuring the power consumed by the memory 13. Therefore, the information processing apparatus 1 can reduce the electric energy consumed by the CPU 11, without depending on the function of the OS 30.

Also, the information processing apparatus 1 changes the operating frequency of the CPU 11 according to the power consumption of the memory 13 measured in real time, instead of the pre-analysis result. Therefore, the information processing apparatus 1 can set an appropriate operating frequency to the CPU 11 in real time according to the contents of the processing with respect to the running application.

[b] Second Embodiment

Although the embodiments have been described so far, the embodiments may be implemented in various different forms in addition to the above-described embodiments. Therefore, another embodiment included in the present invention as the following second embodiment will be described.

(1) Regarding Setting of Operating Frequency

The information processing apparatus 1 sets the operating frequency of the CPU 11 by determining an operating frequency optimal to the OS 30 and outputting the operating frequency setting file 35 indicating the determined operating frequency. However, the embodiment is not limited thereto. Another aspect of the information processing apparatus according to the present application will be described with reference to FIG. 9.

Figure 9:
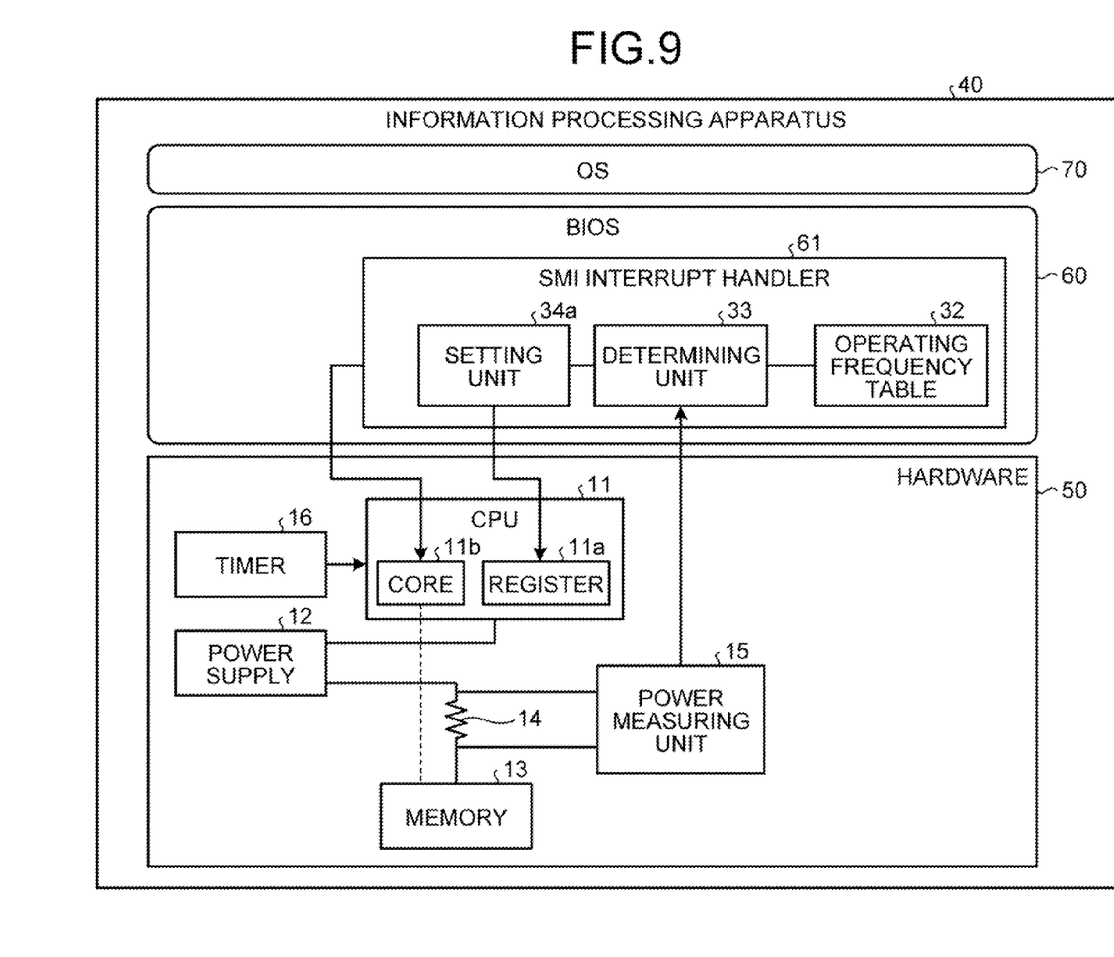
FIG. 9 is a diagram illustrating an example of an information processing apparatus according to a second embodiment.

FIG. 9 is a diagram illustrating an example of the information processing apparatus according to the second embodiment. In the example illustrated in FIG. 9, an information processing apparatus 40 includes a hardware 50, a BIOS 60, and an OS 70. The hardware 50 includes the CPU 11, the power supply 12, the memory 13, the resistor 14, the power measuring unit 15, and a timer 16. Also, the BIOS 60 includes a SMI (System Management Interrupt) interrupt handler 61. Moreover, the SMI interrupt handler 61 includes the operating frequency table 32, the determining unit 33, and a setting unit 34a.

Also, since the power supply 12, the memory 13, the resistor 14, and the power measuring unit 15 exhibit the similar functions to those of the first embodiment, the description thereof will not be repeated. In addition, since the operating frequency table 32 and the determining unit 33 exhibit the similar functions to those of the first embodiment, the description thereof will not be repeated.

As with the first embodiment, the CPU 11 is an arithmetic processing apparatus that performs arithmetic processing by using information stored in the memory 13. In more detail, the CPU 11 includes a register 11a that can set and refer to the operating frequency of the CPU 11, and a core 11b that performs the arithmetic processing.

The register 11a stores information indicating the frequency at which the core 11b performs the arithmetic processing, that is, the operating frequency of the CPU 11.

Also, if the core 11b receives the SMI interrupt from the timer 16, which will be described below, the core 11b changes to a mode called a SMM (System Management Mode) and executes the SMI interrupt handler 61 included in the BIOS 60. Also, the core 11b refers to the information indicating the operating frequency, which is stored in the register 11a, and performs the processing at the operating frequency indicated by the referred information.

The timer 16 issues the SMI interrupt to the CPU 11 at predetermined time intervals. Also, in the case where the setting unit 34a receives the information indicating the operating frequency from the determining unit 33, the setting unit 34a rewrites the information indicating the operating frequency, which is stored in the register 11a, to information newly received from the determining unit 33.

As described above, the information processing apparatus 40 includes the SMI interrupt handler 61 that sets the operating frequency of the CPU 11. The information processing apparatus 40 sets an optimal operating frequency through the SMI interrupt handler 61 by issuing the SMI interrupt at predetermined time intervals. Also, the information processing apparatus 40 changes the operating frequency of the CPU 11 by storing the information indicating the operating frequency in the register 11a included in the CPU 11. Therefore, the information processing apparatus 40 can set the operating frequency of the CPU 11, regardless of the types of the running OS 70.

Also, the information processing apparatus 40 sets the operating frequency of the CPU 11 by using the SMI interrupt handler 61 included in the BIOS 60. Therefore, the information processing apparatus 40 can quickly perform the processing of setting the operating frequency of the CPU 11.

(2) Regarding Set Operating Frequency

The information stored in the operating frequency table 32 illustrated in FIG. 4 is merely exemplary, and different values may be stored with respect to the power consumption ranges of the memory 13 and the operating frequencies. That is, the information processing apparatuses 1, 40 lower the operating frequency of the CPU 11 if the power consumption of the memory 13 is increased, and increases the operating frequency of the CPU 11 if the power consumption of the memory 13 is reduced. Thus, the information processing apparatuses 1, 40 can reduce the electric energy consumed by the CPU 11, without degrading the performance of the application.

(3) Regarding Operating Frequency Table

The above-described information processing apparatuses 1, 40 set the operating frequency of the CPU 11 according to the operating frequency table 32. However, the embodiment is not limited thereto. For example, the information processing apparatuses 1, 40 may calculate the operating frequency that has to be set to the CPU 11 in each case, based on the power consumption of the memory 13, and may set the calculated operating frequency to the CPU 11.

Also, each program exemplified in the above-described embodiment is merely exemplary, and the values of the operating frequency table 32 may be set according to the execution results of other programs. Also, although the operating frequency table 32 stores three sets of the power consumption ranges of the memory 13 and the operating frequencies, the embodiment is not limited thereto. The operating frequency table 32 may store arbitrary sets of the power consumption ranges of the memory 13 and the operating frequencies.

Also, the function of the CPU frequency controlling unit 31 and the function of the SMI interrupt handler 61, which has been described in the embodiments, can be implemented by executing a previously prepared program on a computer such as a personal computer or a workstation. The program may be distributed over a network such as Internet. Also, the program is recorded on a computer-readable recording medium, such as a Hard Disc, a FD (Flexible Disc), a CD-ROM (Compact Disc Read Only Memory), a MO (Magneto Optical Disc), or DVD (Digital Versatile Disc). Also, the program can be executed by being read out from the recording medium by the computer.

According to an aspect, a reduction in power consumption of the CPU can be achieved during application execution.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory, wherein the processor executes a process comprising:
storing a setting information of operating frequencies of the arithmetic processing device in association with power consumption ranges of the memory;
storing the setting information in which an operating frequency at which electric energy consumed by the arithmetic processing device is minimized during the execution of a predetermined application is associated with the power consumption of the memory when the corresponding application is executed by the arithmetic processing device;
measuring power consumption of the memory during the execution of a predetermined application;
determining an operating frequency of the arithmetic processing device corresponding to the power consumption measured at the measuring from the setting information for executing the predetermined application; and
setting the operating frequency of the arithmetic processing device to the operating frequency determined at the determining.

2. The information processing apparatus according to claim 1, wherein the changing changes the operating frequency of the arithmetic processing device to a value lower than a predetermined frequency when the power consumption measured at the measuring is larger than a predetermined threshold value, and the setting sets the operating frequency of the arithmetic processing device to a value higher than the predetermined frequency when the power consumption measured at the measuring is smaller than the predetermined threshold value.

3. The information processing apparatus according to claim 1, wherein the processor executes the process further comprising:
calculating an average value of the power consumption measured at the measuring from the setting of the operating frequency of the arithmetic processing device to an elapse of a predetermined time; and
changing a new operating frequency of the arithmetic processing device according to the calculated average value of the power consumption.

4. The information processing apparatus according to claim 1, wherein the processor executes the process further comprising:
outputting a value indicating the operating frequency of the arithmetic processing device;
referring to the value indicating the operating frequency at the outputting; and
operating at an operating frequency indicated by the value indicating the operating frequency referred at referring.

5. The information processing apparatus according to claim 1, wherein the processor executes the process further comprising:
storing a value indicating the operating frequency of the arithmetic processing device in a register included in the arithmetic processing device; and
changing the operating frequency of the arithmetic processing device by updating the value stored in the register.

6. A method for controlling an information processing apparatus which includes an arithmetic processing device and a memory, the method comprising:
- storing a setting information of operating frequencies of the arithmetic processing device in association with power consumption ranges of the memory;
- storing the setting information in which operating frequency at which electric energy consumed by the arithmetic processing device is minimized during the execution of a predetermined application is associated with the power consumption of the memory when the corresponding application is executed by the arithmetic processing device;
- measuring a power consumption of the memory during the execution of a predetermined application;
- determining an operating frequency of the arithmetic processing device corresponding to the power consumption measured at the measuring from the setting information for executing the predetermined application; and
- changing the operating frequency of the arithmetic processing device to the operating frequency determined at the determining.

7. A non-transitory computer-readable storage medium storing therein a controlling program, the control program causing a computer, which includes an arithmetic processing device and a memory, to execute a process comprising:
- storing a setting information of operating frequencies of the arithmetic processing device in association with power consumption ranges of the memory;
- storing the setting information in which an operating frequency at which electric energy consumed by the arithmetic processing device is minimized during the execution of a predetermined application is associated with the power consumption of the memory when the corresponding application is executed by the arithmetic processing device;
- measuring a power consumption of the memory during the execution of a predetermined application;
- determining an operating frequency of the arithmetic processing device corresponding to the power consumption measured at the measuring from the setting information for executing the predetermined application; and
- changing the operating frequency of the arithmetic processing device to the operating frequency determined at the determining.

* * * * *